(12) United States Patent
Liu et al.

(10) Patent No.: US 9,257,731 B2
(45) Date of Patent: Feb. 9, 2016

(54) METHOD FOR IMPLEMENTING FULL CYCLE REGENERATION OF WASTE LEAD ACID BATTERIES

(76) Inventors: Zhiqiang Liu, Guangdong (CN);
Lixiang Liang, Guangdong (CN)

( * ) Notice: Subject to any disclaimer, the term of this patent is extended or adjusted under 35 U.S.C. 154(b) by 1400 days.

(21) Appl. No.: 13/003,576

(22) PCT Filed: Jul. 10, 2009

(86) PCT No.: PCT/CN2009/072714
§ 371 (c)(1),
(2), (4) Date: Mar. 31, 2011

(87) PCT Pub. No.: WO2010/003382
PCT Pub. Date: Jan. 14, 2010

(65) Prior Publication Data
US 2011/0265969 A1     Nov. 3, 2011

(30) Foreign Application Priority Data

Jul. 11, 2008    (CN) .......................... 2008 1 0029416

(51) Int. Cl.
| | |
|---|---|
| *H01M 10/42* | (2006.01) |
| *C08J 11/00* | (2006.01) |
| *H01M 10/54* | (2006.01) |
| *H01M 6/52* | (2006.01) |
| *H01M 10/06* | (2006.01) |

(52) U.S. Cl.
CPC ................ *H01M 10/54* (2013.01); *H01M 6/52* (2013.01); *H01M 10/06* (2013.01); *Y02W 30/84* (2015.05)

(58) Field of Classification Search
CPC ............ C25C 1/18; C25C 1/00; C22B 13/04; C08J 11/00; H01M 10/42; Y02W 10/00; Y02W 30/54
USPC ....................................................... 205/599
See application file for complete search history.

(56) References Cited

U.S. PATENT DOCUMENTS

| | | | | |
|---|---|---|---|---|
| 4,096,045 | A * | 6/1978 | Ahonen et al. ................. | 205/600 |
| 4,107,007 | A * | 8/1978 | Gaumann et al. .............. | 205/599 |
| 4,118,219 | A * | 10/1978 | Elmore et al. ................... | 75/432 |
| 4,571,261 | A * | 2/1986 | Buren et al. ..................... | 75/696 |
| 2008/0128293 | A1 * | 6/2008 | Mohanta et al. ............... | 205/770 |

* cited by examiner

*Primary Examiner* — Zulmariam Mendez
(74) *Attorney, Agent, or Firm* — George G. Wang; Bei & Ocean

(57) ABSTRACT

A method for implementing full cycle regeneration of a waste lead acid battery is provided. The method includes the following steps. Step (1): the waste lead acid battery is smashed and separated so as to obtain grid lead, diachylon, plastic and waste electrolyte. Step (2): the obtained diachylon after being dried is positioned into an airtight reactor for desulphurization and deoxidation, wherein lead sulfate and the lead dioxide both in the diachylon react to obtain lead monoxide (PbO) and sulfur trioxide ($SO_3$). Step (3): the obtained lead monoxide is reduced by solid phase electrolysis in a wet way so that the lead monoxide is reduced into sponge lead.

10 Claims, 2 Drawing Sheets

METHOD FOR IMPLEMENTING FULL CYCLE REGENERATION OF WASTE LEAD ACID BATTERIES

FIELD OF THE INVENTION

This invention relates to a method for regenerating waste lead acid batteries. In particular, it relates to a regeneration method for waste lead acid batteries at a large industrial scale with such characteristics as low energy consumption, low cost, high-recovery rate, etc. This method implements full cycle regeneration of waste lead acid batteries and meet with the requirement of environment protection.

BACKGROUND OF THE INVENTION

The lead acid battery is widely used in many fields for power storage, such as automobile, telecommunication, railroad, ships, electric vehicles, wind power, solar energy, etc. as a consumptive-material product. It includes a pole plate made up of alloy lead; diachylon consisting of lead sulfate, lead dioxide and lead monoxide; electrolyte containing mainly diluted sulfuric acid; plastic battery enclosure, upper cover and separator, etc. Its annual consumption is huge. If every element of the waste lead acid battery can be substantially recovered for reuse, especially in the production of lead acid batteries so as to implement full cycle regeneration of the waste lead acid battery, the economic benefit is very significant and there is a great social benefit from the associated energy-saving, consumption reducing and environment protection.

However, the known conventional regeneration method of waste lead acid batteries not only wastes a large amount of resource and energy, but also merely recovers parts with high commercial value, such as pole plate and diachylon as well as plastic enclosure from the waste battery. Only simple treatment or even no treatment is made for the other parts of the waste battery, such as plastic separator and electrolyte, and some other parts are simply thrown away without any treatment. Thus, such method is unable to implement full cycle regeneration of the waste lead acid battery, leading to serious problems of environment pollution: the insufficiently treated waste batteries are themselves a serious pollution source and cause the primary pollution; then, the flaws of the regeneration process can cause the secondary pollution. As a result, the waste lead acid battery has become a difficult common environment protection problem for the world.

At present, the conventional regeneration method of waste lead acid batteries includes mainly pyrometallurgical reduction method and electrolysis reduction technology (or wet-treatment method) as detailed below:

Pyrometallurgical Reduction Process

Pyrometallurgical reduction process is a regeneration process to recover diachylon. It has the following shortcomings:

(1) During the pyrometallurgical reduction process, it will cause the secondary pollution due to the reducing agent added which produces a lot of residue. The general pyrometallurgical residue rate of non-converted desulphurization of is 25%~30%, and the residue rate of converted desulphurization is 10%~15%. Both type residues are the waste, which cannot be recovered by the system.

(2) During the pyrometallurgical reduction process, it cannot be avoided to produce a lot of high temperature CO2, nitride gas and minim PbO, SO2, dioxin gas to pollute the environment. Although oxygen-enriching, most-environment friendly liquefied gas or natural gas are used as fuel, and the best dust collection unit is selected, it cannot be avoided to cause the problem to pollute air due to PbO and traces of PbSO4 produced during the direct high-temperature reduction process.

(3) The metal recovery rate of the pyrometallurgical reduction process is low. The lead retained in the residue is as high as 1%~2% for pyrometallurgical process in general. It can reach 3%~8% in worst scenarios. As the residue contains more metal, resource is wasted and the secondary pollution will be caused.

For both the pyrometallurgical reduction process and electrolytic reduction process, it is often necessary to subject the lead sulfate (PbSO4) of the diachylon in waste batteries to a desulphurization process. At present, there are two commonly-used desulphurization methods, as follows:

(I) Raw Material Mixing High-Temperature Melting Method

At present, in the domestic market, more than 90% of smelting method to recover waste battery is using a direct coal-fired reverberatory furnace. Using this method, it is not necessary to separate metal lead and diachylon from the waste battery plate, and the diachylon is mixed directly with scrap iron, sodium carbonate, reducing coal, etc. to have a substitution reaction under a high-temperature condition. As there is no smashing and separating process for the pole plate of the waster battery, it is not an ideal condition for the diachylon in the pole plate to contact with a lead sulfate state, added in with scrap iron, sodium carbonate, reducing coal, etc. Under a high-temperature condition with direct coal burning (over 1000° C.), the lead sulfate part is separated out to produce sulfur trioxide (SO3) gas. A part of PbSO4 and scrap iron is reduced into metal lead in substitution reaction and produces a lot of iron sulfide residue. As a large quantity of air enters during combustion process, SO3 gas contents are low. It is difficult to be recovered such low concentrations of SO3 to be used in manufacturing sulfuric acid and can only be discharged as a waste. In addition, as there is no special desulphurization neutralization unit, the waste SO3 gas will cause the secondary pollution. This method produces the waste residue at a rate of 25~30% of the initial material, further causing a serious pollution of solid waste. Furthermore, the production cost is high and resource waste is serious due consumption of a large quantity of scrap iron converted into waste residue.

(II) Smashing Pre-Treatment Substitution Method of Waste Battery at a Normal Temperature This method is to make a smashing pre-treatment to waste battery to separate metal lead and oxide diachylon. The $PbSO_4$ in diachylon undergoes a substitution reaction at a normal temperature with $Na_2CO_3$ or NaOH added in. Its reaction is shown as follows:

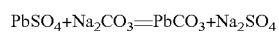

$$PbSO_4+Na_2CO_3=PbCO_3+Na_2SO_4$$

$$PbSO_4+NaOH=PbO+Na_2SO_4$$

The produced $PbCO_3$ and PbO undergo a smelting reduction reaction in the converter. During the smelting process, no $SO_2$ is produced. This method this is substantially free of $SO_2$ pollution. But the method consumes a large quantity of expensive $Na_2CO_3$ or NaOH material to produce the low-value $Na_2SO_4$, which has little demand on the market. The cost of smelting recovery is high and obtained sodium sulfate cannot be reused in the battery manufacture.

Table 1 is an effect comparison of the above two types of desulphurization processes.

| Effect comparison | Process method | |
|---|---|---|
| | Raw material mixing high-temperature melting method | Smashing pre-treatment substitution method of waste battery at a normal temperature |
| Raw material treatment state | No smashing and separating equipment | Smashing and separating equipment is needed. |
| Consumable material of desulphurization | Scrap iron, sodium carbonate, reducing coal | Sodium carbonate, reducing coal |
| Gas produced | 40-50% $PbSO_4$ is dissociated to produce $SO_3$, which is 50 KG/T lead. As a large quantity of air is insufflated into direct combustion, $SO_3$ concentration is low. It is difficult to be used. It is discharged after simple treatment and does not reach the environment standard of discharge, causing serious pollution. | Substitution at a normal temperature to produce gas. Infinitesimal residual $PbSO_4$ is smelted to produce $SO_2$ gas at a high temperature. Oxygen-enriched fuel is adopted. The waste gas reaches the discharge standard after treatment. It is difficult to reuse the waste heat. |
| Residue produced | Residue 300 KG/T lead produced, no value in use and is handled as dangerous waste. | Residue 100 KG/T lead produced, no value in use and is handled as dangerous waste. |
| Cycle regeneration effect | Only recover metal lead, no by-product produced, to produce a large quantity of waste gas/residue, which cannot be reused. | Only recover metal lead, to produce 200 KG $Na_2SO_4$/T lead, which can only be sold as a by-product and has little demand on the market. The cost is high. |

The above two desulphurization processes adopt a substitution reaction principle, to use expensive sodium hydroxide, sodium carbonate, scrap iron, etc. to substitute low-value by-product of sodium sulfate into low-value by-product, sodium sulfate, or dangerous waste, residue, which are difficult to be reused. The material cost to be used as substitution amounts to more than 50% of the manufacture cost.

The current electrolysis reduction technology can effectively solve this problem: the reducing agent is added to produce a large quantity of residue and causes the secondary pollution during the pyrometallurgical process. It can also solve the pollution problem of producing a large quantity of high-temperature $CO_2$, nitride gas and minim PbO, $SO_2$, dioxin gas, etc., which cannot be avoided during the pyrometallurgical process. The electrolysis reduction technology has a higher recovery rate of metal lead and less pollution compared to the pyrometallurgical reduction process method. At present, there are mainly two types of common electrolysis reduction technology. It is described as follows:

(I) Solid Phase Electrolysis Reduction Process in a Wet Way

The main process flow is as follows: smashing and separating battery—coating plate manually with the diachylon consisting of $PbSO_4$, $PbO_2$ and PbO—solid phase electrolysis (NaOH electrolyte)—refining (in solid phase electrolysis, $Na_2SO_4$ is obtained)

There is no desulphurization process during the above-mentioned solid phase electrolysis reduction process. The separated diachylon after directly coating plate is electrolyzed in NaOH. During the electrolysis process, a large quantity of NaOH is consumed. NaOH produces Pb and $Na_2SO_4$ with $PbSO_4$ in diachylon. As there are many kinds of metal oxide, such as $PbSO_4$, $PbO_2$, PbO, etc. in diachylon, $Na_2SO_4$ obtained during the electrolysis process electrolyte has a greater effect on the electrolyte. And electrolyte cycle system is not adopted to separate the electrolyte, causing unstable factors and higher power consumption.

(II) Electrolytic Deposition Process

The difference point to the above-mentioned solid phase electrolysis reduction process is that electrolysis deposition includes a desulphurization process. Its main flow is: smashing and separating battery—the diachylon consisting of $PbSO_4$, $PbO_2$ and PbO is desulphurized and converted with $Na_2CO_3$ or NaOH—thermal decomposition is used to disassociate $PbO_2$ into PbO—silicofluoric acid is used to leach-out PbO as lead ion—deposition electrolysis reduction.

The desulphurization process in the electrolysis deposition process adopts the above-mentioned smashing pre-treatment substitution method of waste battery at a normal temperature.

Table 2 is a comparison table for the above two electrolysis processes

| Process technology | Solid phase electrolysis reduction process in a wet way | Electrolysis deposition process in a wet way |
|---|---|---|
| Process comparison | There are no desulphurization and lead dioxide disassociation processes after raw material is sorted. Multi lead compounds are directly under solid phase electrolysis. | Material is sorted. $Na_2CO_3$ is used to convert diachylon for desulphurization conversion. Thermal decomposition is used to disassociate $PbO_2$ into PbO. Silicofluoric acid is used to leach out PbO as lead ion - deposition electrolysis reduction. |
| Desulphurization method | During the electrolysis process, NaOH is used to substitute sulfur in $PbSO_4$. | Smashing pre-treatment method of substitution at a normal temperature for waste battery is adopted. |
| Desulphurization scheme comparison | NaOH is used to substitute and remove sulfur during the electrolysis process, to obtain $Na_2SO_4$. The treatment and | $Na_2CO_3$ is used to substitute and remove sulfur. The cost is high. $Na_2SO_4$ treatment and recovery is easier compared to the |

| Process technology | Solid phase electrolysis reduction process in a wet way | Electrolysis deposition process in a wet way |
| --- | --- | --- |
| | recovery are difficult. The cost (cooling electrolyte) is very high. Lead consumption/T is larger than 150 Kg NaOH. | solid phase electrolysis reduction process (solid-liquid separation mode), but the cost is very high. Lead consumption/T is larger than 200 Kg $Na_2CO_3$. |
| Deoxidation decomposition | No disassociation $PbO_2$ | $PbO_2$ is disassociated after substitution and removal of sulfur. One more process. |
| $PbO_2$ affection on electrolysis | $PbO_2$ occupies more than 40% of electrolysis material and power consumption is 40% more. | Although $PbO_2$ is disassociated, the anode is easy to regenerate $PbO_2$ during the electrolysis process, which causes high power consumption and unstable factor of production. |
| $PbSO_4$ affection on electrolysis | Electrolysis process continuously produces $Na_2SO_4$ to cause element change of the electrolyte and unstable electrolysis condition. | $PbSO_4$ is difficult to dissolve in the silicofluoric acid. The desulphurization conversion is thorough, which affects direct metal recovery rate. |
| Electrolysis cycle | 24 hours, high power consumption, 1000 KW/T sponge lead | 72~96 hours, high power consumption, 1400 KW/T electrolysis lead |
| De-lead mode of pole plate and coating plate mode | Sponge lead is formed. $Na_2SO_4$ is available, difficult to fall off. | Lead is sheet style, easy to fall off. |
| Direct recovery (diachylon to sponge lead) | >85% | >88%, non-thorough conversion part of $PbSO_4$ and $PbO_2$, unable to be electrolyzed and leached out. |
| Product quality | Lead purity >99.95% | Lead purity >99.99% |
| By-product | $Na_2SO_4$ is less demanded on the market. The price is low. It is unable to be used battery manufacture in cycle. | $Na_2SO_4$ is less demanded on the market. The price is low. It is unable to be used battery manufacture in cycle. |
| Electrolyte | NaOH solution | Smell of silicofluoric acid is large. |
| Production cost | High, electrolysis is uneven. Only small-scale production. | Tiptop |

The electrolysis deposition process has been listed in Demonstration Catalogue for National Advanced Pollution Treatment Technology. Comparing with the current solid phase electrolysis reduction process, both processes have no waste to discharge out. They are favorable for environment protection, but there are still following shortcomings for the electrolysis deposition process in a wet way:

(1) Electrolysis cycle time is longer than that of the solid phase electrolysis reduction process and power consumption is higher.
(2) Desulphurization has to be very thorough. As lead sulfate is not dissolved in silicofluoric acid, desulphurization conversion rate is generally 97%. Therefore the cycle treatment quantity of leaching-out rate is increased.
(3) $PbO_2$ existing makes electrolysis deposition very unstable. In diachylon, $PbO_2$ occupies 40% of the contents. Although thermal decomposition method is adopted to decompose into PbO, a certain quantity of $PbO_2$ is still not decomposed. During electrolysis process, it is easy to make ion produce $PbO_2$ precipitation, which affects power consumption and stability of the electrolysis deposition process.
(4) Silicofluoric acid is used as electrolyte. The gas smell produced form silicofluoric acid is unpleasant.
(5) Cost is too high.
(6) There is still no way to implement full cycle regeneration of waste battery. It can only recover the diachylon from the waste battery in a form of meal lead to be recycled for producing lead acid battery. But the by-product $Na_2SO_4$ cannot be reused in battery manufacture.

DETAILED DESCRIPTION OF THE INVENTION

The purpose of this invention is to provide a process of low power consumption, low cost, high recovery rate and environment protection and able to implement full cycle regeneration process method of waste lead acid battery.

The above-mentioned purpose of the invention is implemented with the following technical scheme, which is able to implement a full cycle regeneration process method of waste lead acid batteries and includes the following steps:

(1) Smashing and separating waste lead acid battery: smashing and separating the waste lead acid battery to obtain grid lead, lead mud and waste electrolyte separately;
(2a) Smelting: smelting, refining and casting the grid lead separated from Step (1) after being washed, to obtain alloy lead ingot;
(2b) Filter pressing: lead mud obtained from Step (1) is filter pressed, to separate solid-liquid, among which the main element of the separated liquid is waste electrolyte and the separated solid is diachylon;
(3a) Purification: purification treatment is made for the waste electrolyte separated from Step (2b) and waste electrolyte obtained from Step (1):
(3b) Drying: the diachylon separated from Step (2b) is dried;
(4) Diachylon desulphurization and deoxidation: thermal decomposition is made to the diachylon after being dried in Step (3b) in an airtight desulphurization reactor for desulphurization and deoxidation. Lead sulfate and lead dioxide in the diachylon are decomposed separately into lead monoxide (PbO), and produce sulfur trioxide ($SO_3$) gas;
(5a) Absorbing: $SO_3$ gas separated from Step (4) is absorbed with sulfuric acid to obtain concentrated sulfuric acid;
(5b) Mixing paste: powder lead monoxide obtained in Step (4) is added with water to mix into a paste state;

(6) Coating plate: the lead monoxide paste obtained in Step (5b) is coated on an electrolysis cathode plate and the cathode plate is dried;
(7) Electrolysis reduction: the cathode plate coated with lead monoxide in Step (6) is put into an electrolytic bath filled with electrolyte for electrolysis at a normal temperature. Direct current is powered on the cathode and anode poles of the electrolyte to make the electrolyte have electrochemical reaction under electrolyte function. The lead monoxide is reduced into sponge lead;
(8) Peeling sponge lead off: peeling off the sponge lead from the cathode plate;
(9) Washing sponge lead: washing sponge lead obtained in Step (8);
(10) Smelting sponge lead: smelting, refining and casting the sponge lead after being washed in Step (9) to obtain metal lead.

The diachylon of the above-mentioned step in the invention is a mixture consisting of lead sulfate ($PbSO_4$), lead dioxide ($PbO_2$) and lead monoxide (PbO). The main element of the mentioned waste electrolyte is diluted sulfuric acid. The purification treatment of the mentioned waste electrolyte in Step (3a) may adopt purification treatment system of sulfuric acid.

The following improvement may be made to the invention: $SO_3$ gas obtained in Step (4) is sent into the purification treatment of waste electrolyte of Step (3a). The sulfuric acid after being filtrated in the system is used to absorb $SO_3$ gas. so as to obtain concentrated sulfuric acid. After it is electrolyzed and filtrated for purification again, it can be used as an electrolyte material to manufacture new battery, as a result to implement reuse of the regenerated material from waste lead acid battery.

Smelting, refining and casting mode of the grid lead obtained in the above-mentioned Step (1) and sponge lead obtained in Step (7) adopts a separated smelting mode, i.e. both of smelting, refining and casting are performed separately. As the obtained grid lead carries acid and metal oxide powder, and the sponge lead is alkaline after solid electrolysis process, clean water is used to wash the remaining material on the grid lead and sponge lead. And smelting, refining and casting are performed separately, so as to obtain alloy lead ingot and metal lead ingot separately. This way is favorable to improve use of the other heavy metals originally existing in the grid lead, so as to save precious metal put into production of alloy lead ingot and improve the value in use for the recovered grid lead. The alloy lead ingot obtained in Step (2a) may be used as a raw material to manufacture lead acid battery in the production of new lead acid battery. The metal lead ingot obtained in Step (10) may be used as a raw material of diachylon to manufacture lead acid battery in the production of new lead acid battery, as a result to implement regeneration and cycle use of waste lead acid battery.

The above-mentioned Step (1) of the invention is based on the difference of the fractionized density and particle size subdivided into every group of waste lead acid battery. In water medium, a physical method, like a smashing and gravity separating method, is used to separate it, so as to obtain grid lead, waste electrolyte, diachylon and plastic separately. During the whole production process, it is performed automatically in a wet and fully airtight way. There is no pollution created during the production process. All water is reused in cycle and in a airtight way.

Pumping is used to make gas in the system operate under a negative pressure. And then filtration is performed and spray gas is discharged.

The following improvement may also be made to the invention: the grid lead obtained in the above-mentioned Step (2a) after smelting, separating and casting can be used in manufacture of pole plate of lead acid battery.

The plastic obtained in Step (1) of the invention mainly includes polyethylene (PE), polypropylene (PP) and polyvinyl chloride (PVC). Polypropylene can be reused in production of battery enclosure. Polyethylene and polyvinyl chloride can be reused in the plastic products, which do not need high quality.

In the invention, smelting in above-mentioned Step (1) means that the grid lead is put into a melting pod for smelting. Refining means that the molten lead is flew into a refining pod for refined to remove impurity in the molten lead. Casting means that the refined molten lead is poured into a mold to cast an alloy lead ingot. The melting, separating and casting the sponge lead performed in Step (10) is the same as smelting grid lead.

The above-mentioned Step (2a) and (2b), or Steps (3a) and (3b), or Steps (5a) and (5b) in the invention may separately express two steps, which may be performed synchronously.

In the desulphurization and deoxidation reaction performed for diachylon in the above-mentioned Step (4) of the invention, desulphurization means that the lead sulfated is disassociated for desulphurization. Deoxidization means that the lead dioxide is disassociated for deoxidization. The reduction reaction equation of thermal decomposition for the diachylon in a desulphurization reactor is shown as follows:

$$PbSO_4 \rightarrow PbO + SO_3 \qquad [a]$$

$$PbO_2 \rightarrow PbO + 0.5 O_2 \qquad [b]$$

The reaction temperature of the materials mentioned in [a] and [b] may be in the range of 705~830° C. (keeping the material under a non-melted state). Better reaction temperature is in the range of 800~820° C. The disassociation time of the diachylon in a desulphurization reactor is 1~2 hours. It is not necessary to add in any reductive material like NaOH, Fe scrap, etc. during the whole desulphurization and deoxidization process of the diachylon. The concentration of obtained $SO_3$ gas is high. It can form concentrated sulfuric acid in reaction with sulfuric acid. The sulfuric acid obtained in Step (3b) after being filtrated is used to absorb the mentioned $SO_3$ gas. The concentrated sulfuric acid obtained may be reused in production of new lead acid battery and electrolyte after it is purified in an electrolysis way and filtrated, so as to implement regeneration and reuse of sulfuric acid. The desulphurization rate of the lead sulfate may be larger than 98% after disassociation desulphurization. The deoxidation rate is larger than 97% after the lead dioxide has disassociation deoxidation. The particle size of the obtained lead monoxide is in the range of 16~50 MU after thermal decomposition and reduction reaction.

In above-mentioned Step (5) of the invention, the weight proportion of water added in and lead monoxide is in the range of 13:100~18:100.

The invention may be improved further: the electrolysis reduction process in the above-mentioned Step (7) adopts solid phase electrolysis reduction process in a wet way. The electrolyte adopts sodium hydroxide (NaOH) solution. The anode and cathode coated with lead oxide paste are put into an electrolytic bath, i.e. with a certain space. The mentioned anode and cathode implement chemical reaction under the function of direct current and sodium hydroxide electrolyte to reduce lead oxide into sponge lead. Where the mass percentage concentration of the sodium hydroxide electrolyte is in the range of 80%-15%. The electrolysis time is 18~22 hours.

Voltage is 1.5-2.5 v, and current is 450-600 A/m². The chemical reaction equation in the electrolytic bath is shown as follows:

Cathode $PbO+H_2O+2e=Pb+2OH^-$ [c]

Anode $2OH-2e=H_2O+0.5O_2$ [d]

In the solid phase reduction electrolysis process in a wet way, an electrolyte cycle filter system can be adopted. The electrolyte in the electrolytic bath is formed as a cycle loop. In the loop, a filter channel, and an electrolyte temperature and concentration control unit are set up to collect sponge lead in the electrolyte and keep the electrolyte temperature and concentration stable, which will be favorable for improving electrolysis efficiency. As the lead sulfate desulphurization efficiency can reach more than 98% in Step (4), the remaining lead sulfate is electrolyzed in the electrolyte of Step (7). Its reaction equation is: $PbSO_4+2e=Pb+SO_4^{2-}$, and then $Na_2SO_4$ is produced. Therefore, minim $PbSO_4$ will neither cause any affection on electrolysis nor create the pollution problem due to $SO_2$ gas separated out.

As grid lead and sponge lead are fine particles, it is not so easy to be melted like large massive lead ingot. In order to increase the direct recovery rate of metal lead, this invention adopts a screw pressure feeder to press grid lead or sponge lead directly into a melting pot. They are melted under an airtight condition as a separately melting mode. Melting process of the grid lead or sponge lead is a physical melting process to be heated indirectly in a melting pot. High-temperature flaming gas transfers heat to the melting pot indirectly. Flaming waste gas is waste gas as fuel itself, which can be used as used heat. Oxygen-enriched combustion is adopted to be more favorable for decreasing waste gas quantity.

Refining is to remove impurity in the molten lead. The mentioned impurity in this invention means minim non-reduction oxide, like lead oxide. And in the refining process, it is required to ad in metals, such as calcium, stibonium, according to the element of battery grid plate to remove the impurity in the molten lead. Some oxidant is used usually to oxidize un-necessary metal to form dross for removal.

After the above-mentioned refuting Step (10), the direct recovery rate of metal lead can reach more than 96%; Produced dross is 3~4%. The main element of dross is lead oxide. It will be reused after being ground. The total lead recovery rate is more than 99%.

This invention may be improved as follows: the process includes a waste water treatment step: the waste water produced in the above-mentioned Steps (1)~(10) is collected into a waste water treatment system. After it is purified, it can be reused in cycle to implement zero discharge of production water. It both complies with the requirement of environment protection and save water resource:

In order to be easy to compare, the invention process and solid phase electrolysis reduction process and electrolysis deposition process in a wet way are compared, shown in the following table:

TABLE 3

Comparison table of process efficiency of this invention and other electrolysis technology.

| Process technology | Solid phase electrolysis reduction process | Electrolysis deposition process in a wet way | Full cycle regeneration process of waste lead acid battery of this invention |
|---|---|---|---|
| Process comparison | There are no desulphurization and lead dioxide disassociation processes after raw material is sorted. Multi lead compounds are directly under solid phase electrolysis. | Material separating. $Na_2CO_3$ is used for desulphurization conversion. Heat decomposition is used for $PbCO_3$ and $PbO_2$ disassociation into PbO. Silicofluoric acid is used to leach-out PbO into lead ion - deposition electrolysis reduction. | Material is separated as a pre-treatment. Airtight disassociation desulphurization, deoxidation, solid phase electrolysis reduction are adopted. No need to add any reduction materials such as NaOH, $Na_2CO_3$, Fe scrap, etc. |
| Desulphurization method | During the electrolysis process, NaOH is used to substitute sulfur in $PbSO_4$. | $Na_2CO_3$ is adopted for pre-treatment. After desulphurization, decomposition is performed. | Heat decomposition mode is used for desulphurization in $PbSO_4$ and $PbO_2$ decomposition. |
| Desulphurization scheme comparison | NaOH is used in electrolysis process for substitution and desulfurization, and to form $Na_2SO_4$. It is difficult to treat and recover (cooling electrolyte). Cost is very high. Lead consumption per T is more than 150 Kg NaOH. | The cost to $Na_2CO_3$ for substitution and desulfurization is high. Treatment and recovery of $Na_2SO_4$ is easier compared to solid phase electrolysis (separation of solid and liquid), but cost is high. Lead consumption per T is more than 200 Kg $Na_2CO_3$ | Disassociation technology is used for desulphurization. No other material is used for substitution, so as so save raw material. Cost is low. Only little heat energy is consumed, 40 Kg coal/T lead. |
| Deoxidation decomposition | No disassociation $PbO_2$ | After substitution, disassociation $PbO_2$, is performed. One more step. | Disassociation takes place at the same time of $PbO_2$ disassociation. |
| $PbO_2$ affection on electrolysis | $PbO_2$ occupies more than 40% of raw material. 40% more power consumption. | Although $PbO_2$ disassociation is done, the anode is easy to re-produce $PbO_2$ in the electrolysis process, which causes high power consumption and unstable production factor. Remaining $PbO_2$ is not dissolved in silicofluoric acid. Direct recovery rate is low. | No $PbO_2$ is produced during electrolysis process. The remaining $PbO_2$ can be reduced during electrolysis process. Direct recovery rate is high. |

TABLE 3-continued

Comparison table of process efficiency of this invention and other electrolysis technology.

| Process technology | Solid phase electrolysis reduction process | Electrolysis deposition process in a wet way | Full cycle regeneration process of waste lead acid battery of this invention |
|---|---|---|---|
| $PbSO_4$ affection on electrolysis | Electrolysis process continuously produces $Na_2SO_4$ to cause element change of the electrolyte and unstable electrolysis condition. | $PbSO_4$ is difficult to be dissolved in silicofluoric acid. Desulphurization conversion is not thorough, which affects direct metal recover. | Remaining minim $PbSO_4$ is reduced into metal lead during electrolysis process. The direct recovery rate is high. It will produce minim $Na_2SO_4$, no large affection on electrolyte element. |
| Electrolysis cycle | 24 hours. High power consumption 1000 Kwh/T sponge lead | 72~96 hours. High power consumption 1400 Kwh/T electrolysis lead. | 18 hours. Low power consumption, 500 Kwh/T sponge lead |
| Pole plate to fall lead off. Coating plate mode | Sponge lead is formed. $Na_2SO_4$ is available, difficult to fall off. | Lead is sheet, easy to fall off. | Sponge lead is formed. No $Na_2SO_4$, easy to fall off. |
| Direct recovery (diachylon to sponge lead) | >85% | >88%, non-thorough conversion part of $PbSO_4$ and $PbO_2$, unable to be electrolyzed and leached out. | >88% (solving diachylon to fall off.) |
| Product quality By-product | Lead purity >99.95% $Na_2SO_4$, low market demand. Low price. Unable to use itself. | Lead purity >99.99% $Na_2SO_4$, low market demand. Low price. Unable to use itself. | Lead purity >99.95% $H_2SO_4$, high market demand. High price. It is a production material of battery, able to reuse in cycle. |
| Electrolyte Production cost | NaOH solution High, electrolysis is uneven. Only small-scale production. | Smell of silicofluoric acid is large. Tiptop | NaOH solution Low, able to enlarge pole piece, to improve efficiency, able to make a large-scale production. |

The core of this invention is "raw material pre-treatment of waste lead acid battery—disassociation desulphurization and deoxidation of diachylon under an airtight condition—solid phase electrolysis reduction in a wet way—manufacture of new lead acid battery" process. Comparing with the current technology, as for the environment protection, low energy consumption and low cost to implement a large-scale industrial production of full cycle regeneration in a wet way, it has the following significant effect:

(1) The regeneration process of waste lead acid of this invention makes it possible to implement full cycle regeneration of waste lead acid batteries so as to completely reuse them in manufacturing new batteries. This invention provides a process starting from the step of smashing and separating to regeneration of grid lead and lead mud. The plastic, alloy lead, metal lead and sulfuric acid, which are obtained separately, can be used as materials in manufacturing new batteries. The entire process to implement full cycle regeneration of waste lead acid batteries only need consume sodium hydroxide electrolyte. All the materials to manufacture new batteries can be obtained from the regeneration process of waste batteries. In this way, it not only saves cost and resources, but also solves the difficult problems concerning environment protection caused by waste batteries.

(2) The smashing and separating step of the regeneration process of the present invention can effectively separate metal and plastic, grid lead and metal oxide diachylon, making them easy for further regeneration treatment. It not only solves the problem of diachylon conversion and desulphurization for creating a condition to increase the recovery value of metal lead, but also improves other metal reuse value in grid alloy lead.

(3) The diachylon disassociation desulphurization and deoxidation step of the regeneration process of the present invention is conducted in an airtight reactor and does not need adding substitution chemical material. It consumes lower heat energy and uses a heating mode to make disassociation for the sulfide and oxide in the raw material. The production cost is about 10% of what is for the substitution method. The method adopts an airtight disassociation mode, and is able to increase sulfur trioxide concentration so that it can be decomposed most effectively. The sulfur trioxide concentration obtained is high, and thus can be used a raw material to manufacture sulfuric acid. Regeneration rate of material is high and production cost of sulfuric acid is low. In addition, the value of sulfuric acid is several times higher than that of sodium sulfate. Therefore this process is the most advanced method for saving energy, decreasing discharge and regeneration.

(4) This invention adopts a disassociation desulphurization and deoxidation technology for desulphurization of the lead sulfate in diachylon and for deoxidation of the lead dioxide in diachylon under an airtight condition. Both can be converted to lead monoxide, whose electrolysis energy consumption is the lowest, thereby decreasing the cost of electrolysis energy consumption in the next solid phase electrolysis process for lead sulfate and lead dioxide, with about a 40% decrease in power consumption. It can also solve the problems of the loss of electrolyte sodium hydroxide and unstable concentration.

(5) This invention overcomes the shortcoming of direct electrolysis of diachylon in the original solid phase electrolysis process. Different kinds of lead chemical compounds in diachylon are changed into a single type lead oxide for electrolysis. In this way, it can effectively overcome several unstable factors in the electrolysis process of solid phase electrolysis, thereby achieving stable electrolysis condition, low power consumption, no sodium sulfate produced in the electrolysis process, and playing a very important role in decreasing production cost, using electrolysis with large-area pole plates, and implementing modernization and large-scale production.

(6) The solid phase electrolysis reduction process of the present invention utilizes an electrolyte cycle filter system to collect the sponge lead in electrolyte, so as to further increase recovery rate of sponge lead and keep a stable condition for electrolyte temperature and concentration, which help to enhance the electrolysis efficiency.

(7) The coating plate step of the present invention can be performed under a fully wet condition, without involving any any chemical reaction process and dust producing process. The entire process of mixing paste, coating plate and drying can be performed under an airtight condition, which helps improvement of environment protection in the production process.

(8) The smashing, the refining and casting of grid lead and sponge lead in this invention adopts a separately melting and smelting mode. The separately melting mode adopted by both helps create a condition for increasing recovery value of metal lead. It not only solves the conversion problem of diachylon desulphurization, but also increases the utilizaiton rate of the other heavy metals in the grid lead. As a result, there is a reduction in the amount (and the cost) of the expensive metal element (for example, Se) that needs to be added into lead ingot again in lead alloy production.

(9) The metal recovery rate of this invention is high, which can reach more than 99%. The recovery rate of residue acid is 100%. Plastic recovery rate can reach 99%. Power consumption for every ton of sponge lead produced is about 500 Kw, reaching electrolysis efficiency ≥96%, recovery rate of metal lead ≥99%, and purity of recovered lead reaches 99.95%.

(10) The entire process of the present invention is under an airtight condition in a fully wet way. The sulfur trioxide gas produced with the process is completely absorbed to be used in manufacturing sulfuric acid, as a raw material of electrolyte for making new battery. There is not any waste gas discharged during the production process. And the process does not discharge any waste residue. Waste water produced in the production process is reused in cycle totally under an airtight condition, resulting in zero discharge of waste water. The process of this invention can fully meet with the requirement of environment protection: discharges of none waste water, none waste gas and none waste residue, or the "three-none" standard.

IMPLEMENTATION EXAMPLE 1

Figure 1:
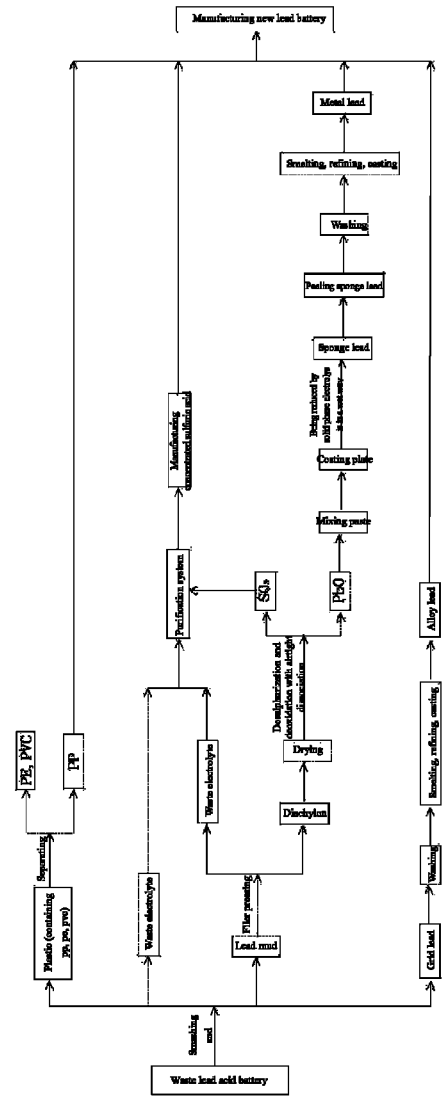
FIG. 1 is a flow chart to implement the full cycle regeneration process of waste lead acid battery, as one of the Invention Implementation Examples of the present invention.
Figure 2:
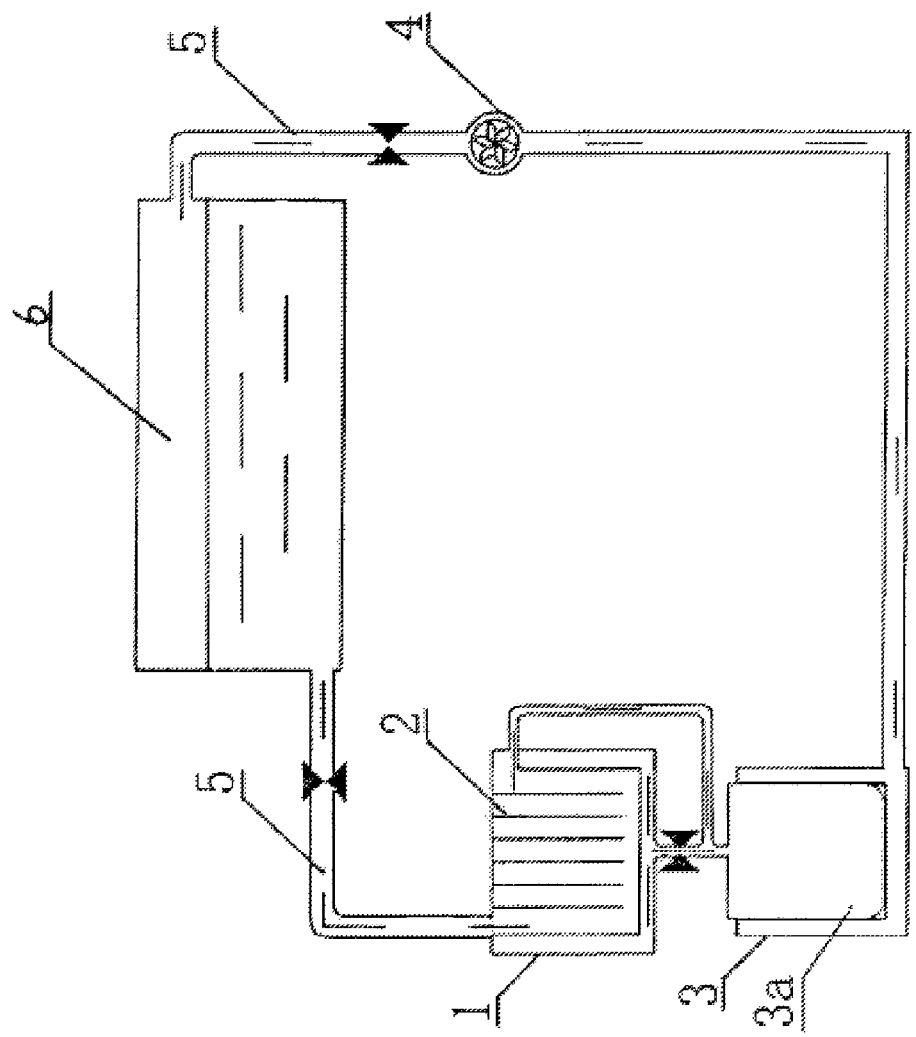
FIG. 2 is a flow chart of electrolyte cycle filter system used in the solid phase electrolysis reduction process in a wet manner, which is one of Invention Implementation Examples of the present invention.

As shown in FIGS. 1 and 2, it is a full cycle regeneration process of waste lead acid batteryies, which represents one of Invention Implementation Examples. It includes the following steps:

(1) Smashing and separating waste lead acid battery: smashing and separating waste lead acid battery to obtain alloy lead, lead mud, plastic and waste electrolyte, i.e., the diluted sulfuric acid, separately;

(2a) Smelting: grid lead separated from Step (1) is smelted, refined and cast after being washed. The obtained alloy lead ingot will be used in the manufacture of the battery pole plate. Smelting in Step (1) means that the grid lead is put into a melting pod for melting. Refining means that the molten lead is refuted in a refining pod to remove impurities in the molten lead. Casting means that the refined molten lead is poured into a mold to cast an alloy lead ingot.

The separating process of waste lead acid battery is a step in which the waste battery is smashed in a crusher. The material then passes a vibration screen. Less than 1 mm diachylon is separated out by the vibration screen. This part of diachylon is formed into lead mud with electrolysis acid liquor. Grid lead and plastic larger than 1 mm enter a gravity separation system of grid lead and plastic on the upper surface of the vibration screen. According to the difference of specific gravity, plastic and grid lead are separated out. The last plastic part is further separated in a plastic separating system according to the difference of plastic specific gravity to separate out polyethylene (PE), polypropylene (PP) and polyvinyl chloride (PVC). The known technology is adopted to treat the separated plastic, for reusing polypropylene in production of plastic battery enclosures and reusing polyethylene and polyvinyl chloride in the other plastic products, for which the materials do not need be of high quality.

(2b) Filter pressing: the lead mud obtained from Step (1) is filter pressed to separate the solid from the liquid, among which the main element of the separated liquid is waste electrolyte, i.e., diluted sulfuric acid, and the separated solid is diachylon. The mentioned diachylon is a mixture consisting of lead sulfate ($PbSO_4$), lead dioxide ($PbO_2$) and lead monoxide (PbO);

(3a) Purification: the purification treatment is conducted on the waste electrolyte separated from Step (2b) and waste electrolyte obtained from Step (1); Step (2a) smelting and (2b) filter pressing can be performed at the same time;

(3b) Drying: the diachylon separated from Step (2b) is dried;

(4) Desulphurization and deoxidation for diachylon: disassociation desulphurization and deoxidation process of diachylon is performed under an airtight condition. The diachylon after being dried in Step (3) makes desulphurization and deoxidation in an airtight desulphurization reactor. All the lead sulfate in diachylon is decomposed into lead monoxide (PbO), whose electrolysis energy is the lowest, and used to produce sulfur trioxide ($SO_3$). All the lead dioxide in diachylon is converted into lead monoxide (PbO), whose electrolysis energy is the lowest. The particle size of the lead monoxide obtained in the step is about 20 MU (or mesh);

The diachylon reaction equation of heat reduction in the desulphurization reactor is shown as follows:

$$PbSO_4 \rightarrow PbO + SO_3 \qquad [a]$$

$$PbO_2 \rightarrow PbO + 0.5 O_2 \qquad [b]$$

The reaction temperature of the material in the above-mentioned [a] and [b] is 800° C. The disassociation time of the diachylon in the desulphurization reactor is 2 hours;

(5a) Absorbing: $SO_3$ gas separated out in Step (4) is sent into a purification system of sulfuric acid in Step (3b). It reacts with the filtrated sulfuric acid to obtain concentrated sulfuric acid. The mentioned concentrated sulfuric acid is electrolyzed, purified and filtrated again to be used as the electrolyte material for battery manufacturing;

(5b) Mixing paste: the lead monoxide powder obtained in Step (4) is mixed with water to form a paste. The weight ratio of the added water over the lead monoxide is 13:100;

(6) Coating plate: the lead monoxide paste obtained in Step (5) is coated on electrolysis cathode plate 2, which is then dryed;

(7) Electrolysis reduction: a "wet" solid phase reduction process is adopted. The electrolyte uses a sodium hydroxide (NaOH) solution. Cathode plate 2 coated with lead monoxide in Step (6) is put into electrolytic bath 1 filled with the sodium hydroxide (NaOH) solution for electrolysis at room temperature. Direct current is powered between the cathode and anode poles in the electrolyte so that the electrolyte undergoes electrochemical reaction under the mentioned conditions. The lead monoxide is reduced into sponge lead; Mass percentage concentration of the sodium hydroxide electrolyte is 8%. Electrolysis time is 18 hours. Anode and cathode coated with lead monoxide paste are put into electrolytic bath 1. Voltage is 2 v and current is 500 A/m². The chemical reaction equation in electrolytic bath 1 is shown as follows:

Cathode $PbO+H_2O+2e=Pb+2OH^-$     [c]

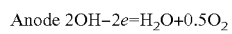

Anode $2OH-2e=H_2O+0.5O_2$     [d]

In the "wet" solid phase electrolysis reduction process, an electrolyte cycle filter system is adopted, in which filter channel 3, electrolyte regulating tank 6 and electrolyte concentration control unit are added. The mentioned filter channel 3 and electrolyte regulating tank 6 are joined with electrolytic bath 1 to form an electrolyte cycle loop with pipe 5. The function of filter channel 3 is to collect sponge lead in the electrolyte by filter unit 3a. The electrolyte concentration control unit includes pump 4, electrolyte temperature/concentration inductor and control circuit board. Functionally, the electrolyte temperature/concentration inductor monitors the electrolyte concentration, and sends an operation signal to the control circuit according to the inductor's state. Control pump 4 runs to keep a stable electrolyte temperature and concentration;

(8) Peeling sponge lead off: the sponge lead is peeled off from cathode plate 2;

(9) Washing of sponge lead: sponge lead obtained in Step (8) is washed;

(10) Refining: smelting, refining and casting the sponge lead after being washed in Step (9) to obtain metal lead; The smelting, refining and casting mode of sponge lead is the same process as that of smelting grid lead. The only difference is to adopt a separately melting mode, i.e., smelting, refining and casting are performed separately for sponge lead and for grid lead. Such separating mode is better for further treatment of grid lead, resulting in better use and treatment of metal lead improvement in its recovery value. The grid lead, directly smashed and separated from waste lead acid battery and processed into alloy lead in the melting recovery process, can be used to manufacture battery pole plates, with great cost savings.

(11) Regeneration of lead acid battery: the plastics obtained in Step (1) mainly include polyethylene (PE), polypropylene (PP) and polyvinyl chloride (PVC). Polypropylene can be reused in production of battery enclosures. Polyethylene and polyvinyl chloride can be reused in those plastic products which do not require high quality of materials. The sulfuric acid obtained in Steps (1) and (4) can be used to absorb $SO_3$ gas produced in Step (4) to produce concentrated sulfuric acid. After it is electrolyzed, purified and filtrated, it will become a raw material to produce electrolyte in new lead acid batteries. The alloy lead obtained in Step (2a) and the metal lead obtained in Step (10) will become a raw materials to manufacture the pole plate and diachylon, respectively, in new batteries. As such, all the parts from waste lead acid batteries can be regenerated and reused in the manufacture of new lead acid batteries, i.e., a full cycle regeneration of waste the lead acid battery is achieved.

In the present invention, the above-mentioned Steps (2a) and (2b) can be performed simultaneously. The same applies to Steps (3a) and (3b), and to Steps (5a) and (5b). This invention may also include a waste water treatment system: the waste water produced in the above-mentioned Steps (1)~(10) is collected into a waste water treatment system. After being purified, it is to be recycled and reused to realize zero discharge of waste water.

The entire production process, including mixing paste, coating plate and drying, is performed under an airtight condition in a fully wet manner.

IMPLEMENTATION EXAMPLE 2

The differences from Implementation Examples 1 are: in Step (4), in the desulphurization rector, the reaction temperature of the material is 805° C. C. The disassociation time of the diachylon in the desulphurization reactor is 1.8 hours. In Step (5b), the weight proportion of water in lead monoxide paste and lead monoxide is 15:100. In Step (7), the mass percentage concentration of sodium hydroxide electrolyte is 10%. Electrolysis time is 19 hours.

IMPLEMENTATION EXAMPLE 3

The differences from Implementation Examples 1 are: in Step (4), in the desulphurization rector, the reaction temperature of the material is 810° C. The disassociation time of the diachylon in the desulphurization reactor is 1.5 hours. In Step (5b), the weight proportion of water in lead monoxide paste and lead monoxide is 15:100. In Step (7), the mass percentage concentration of sodium hydroxide electrolyte is 10%. Electrolysis time is 20 hours.

IMPLEMENTATION EXAMPLE 4

The differences from Implementation Examples 1 are: In Step (4), in the desulphurization rector, the reaction temperature of the material is 815° C. The disassociation time of the diachylon in the desulphurization reactor is 1.2 hours. In Step (5b), the weight proportion of water in lead monoxide paste and lead monoxide is 16:100. In Step (7), the mass percentage concentration of sodium hydroxide electrolyte is 12%. Electrolysis time is 21 hours.

IMPLEMENTATION EXAMPLE 5

The differences from Implementation Examples 1 are: in Step (4), in the desulphurization rector, the reaction temperature of the material is 820° C. The disassociation time of the diachylon in the desulphurization reactor is 1 hour. In Step (5b), the weight proportion of water in lead monoxide paste and lead monoxide is 18:100. In Step (7), the mass percentage concentration of sodium hydroxide electrolyte is 15%. Electrolysis time is 22 hours.

The invention claimed is:
1. A method for a full cycle regeneration process of waste lead acid batteries, comprising the following steps:
   (1) smashing and separating waste lead acid batteries to obtain grid lead, lead mud and waste electrolyte separately;
   (2a) smelting, refining and casting the grid lead separated from Step (1) after being washed, to obtain alloy lead ingot;
   (2b) filter pressing the lead mud obtained from Step (1) to separate solid and liquid, the main element of the separated liquid being waste electrolyte and the separated solid being diachylon;
   (3a) purifying the waste electrolyte separated from Step (2b) and waste electrolyte obtained from Step (1);
   (3b) drying the diachylon separated from Step (2b);
   (4) thermal decomposing the diachylon after being dried in step (3b) in an airtight desulphurization reactor for desulphurization and deoxidation, with the lead sulfate and lead dioxide in the diachylon being decomposed separately into lead monoxide (PbO), and producing sulfur trioxide ($SO_3$) gas;
   (5a) absorbing the $SO_3$ gas separated from Step (4) with sulfuric acid to obtain concentrated sulfuric acid;
   (5b) mixing the powder-type lead monoxide obtained in Step (4) with water to obtain a lead monoxide paste;
   (6) coating the lead monoxide paste obtained in Step (5b) on an electrolysis cathode plate and drying the cathode plate;
   (7) immersing the cathode plate coated with lead monoxide in Step (6) into an electrolytic bath filled with electrolyte and performing electrolysis at room temperature with direct current supplied to cathode and anode poles to reduce the lead monoxide is reduced into sponge lead;
   (8) peeling off the sponge lead from the cathode plate;
   (9) washing the sponge lead obtained in Step (8);
   (10) smelting, refining and casting the sponge lead after being washed in Step (9) to obtain metal lead.
2. The method according to claim 1, wherein in Step (4), desulphurization and deoxidation reaction for diachylon is conducted in a desulphurization reactor, in which desulphurization is disassociation desulphurization of lead sulfated and deoxidation is disassociation deoxidation of lead dioxide, and heat reduction reaction equation of diachylon in said reactor is shown as follows and are conducted at a temperature within the range from 705 to 830° C.:

$$PbSO_4 \rightarrow PbO + SO_3 \qquad (a)$$

$$PbO_2 \rightarrow PbO + 0.5O_2 \qquad (b)$$

3. The method according to claim 2, wherein the reaction temperature reactions (a) and (b) is in the range of 800~820° C., which are performed for 1~2 hours.
4. The method according to claim 3, wherein the smelting, refining and casting mode of the grid lead obtained in Step (1) and the sponge lead obtained in Step (7) adopt separate melting mode, and Step (2a) and Step (10) are performed separately.
5. The method according to claim 4, wherein the alloy lead ingot obtained in Step (2a) becomes a suitable raw material to manufacture the pole plate for new lead acid batteries and the lead ingot obtained in Step (10) becomes a suitable raw material to manufacture diachylon for a new lead acid battery.
6. The method according to claim 1, wherein the $SO_3$ gas obtained in Step (4) is sent to said waste electrolyte in Step (3a) which absorbs the $SO_3$ gas to produce concentrated sulfuric acid.
7. The method according to claim 6, wherein after the concentrated sulfuric acid is electrolyzed, purified and filtrated, it becomes a suitable raw material to manufacture electrolyte for a new lead acid battery.
8. The method according to claim 1, wherein the weight proportion of the water and lead monoxide is in the range of 13:100~18:100 as in Step (5b).
9. The method according to claim 8, wherein the electrolysis reduction process in Step (7) is a wet type of solid phase electrolysis reduction process; the electrolyte is sodium hydroxide solution; the anode and cathode coated with lead oxide paste are immersed into an electrolytic bath; the anode and cathode perform the chemical reaction as the function of direct current and sodium hydroxide electrolyte to reduce lead oxide into sponge lead; the sodium hydroxide electrolyte is in the range of 8%~15% by weight; and the chemical reactions in the electrolytic bath, performed for 18-22 hours, are as follows:

$$\text{Cathode } PbO + H_2O + 2e = Pb + 2OH^- \qquad (c)$$

$$\text{Anode } 2OH - 2e = H_2O + 0.5O_2 \qquad (d).$$

10. The method according to claim 9, further comprising a waste water treatment step to purify waste water collected from Steps (1)~(10) so that it can be reused in cycle to realize zero discharge of waste water.

* * * * *